(12) United States Patent
Lee

(10) Patent No.: US 9,502,722 B2
(45) Date of Patent: Nov. 22, 2016

(54) HEATING DEVICE FOR END PLATE OF FUEL CELL STACK

(75) Inventor: Sung Ho Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 946 days.

(21) Appl. No.: 13/039,704

(22) Filed: Mar. 3, 2011

(65) Prior Publication Data

US 2012/0100450 A1    Apr. 26, 2012

(30) Foreign Application Priority Data

Oct. 25, 2010    (KR) .................. 10-2010-0103805

(51) Int. Cl.
     *H01M 8/04*      (2006.01)
     *H01M 8/02*      (2016.01)
     *H01M 8/24*      (2016.01)

(52) U.S. Cl.
     CPC ....... *H01M 8/04074* (2013.01); *H01M 8/0267* (2013.01); *H01M 8/24* (2013.01); *Y02E 60/50* (2013.01)

(58) Field of Classification Search
     CPC .................. H01M 8/0204; H01M 8/0206
     See application file for complete search history.

(56) References Cited

U.S. PATENT DOCUMENTS

| | | | |
|---|---|---|---|
| 2006/0210856 A1 | 9/2006 | Bradean et al. | |
| 2008/0090122 A1* | 4/2008 | Andreas-Schott et al. | 429/25 |
| 2010/0310958 A1* | 12/2010 | Naito et al. | 429/434 |

FOREIGN PATENT DOCUMENTS

| | | |
|---|---|---|
| CN | 1406400 A | 3/2003 |
| CN | 101785135 A | 7/2010 |
| JP | 2000164234 A | 6/2000 |
| JP | 2000294262 A | 10/2000 |
| JP | 2001-068141 A | 3/2001 |
| JP | 2001068141 A | 3/2001 |
| JP | 2004-185933 A | 7/2004 |
| JP | 2004288509 A | 10/2004 |
| JP | 2005285682 A | 10/2005 |

* cited by examiner

*Primary Examiner* — Barbara Gilliam
*Assistant Examiner* — Adam A Arciero
(74) *Attorney, Agent, or Firm* — Mintz Levin Cohn Ferris Glovsky and Popeo, P.C.; Peter F. Corless

(57) ABSTRACT

The present invention provides a heating device for an end plate of a fuel cell stack, which can prevent a decrease in temperature of unit cells around the ends of the fuel cell stack by providing a structure for circulating high temperature coolant discharged from the fuel cell stack in the end plate. Non-uniform temperature distribution in the fuel cell stack can thereby be prevented. In particular, a heating device for an end plate of a fuel cell stack is provided wherein high temperature coolant flowing from the upstream of a coolant outlet manifold to the downstream is allowed to circulate through the inside of the end plate and to be discharged to the outside such that the thermal energy of the coolant is supplied to the end plate and, at the same time, transferred to unit cells adjacent to the end plate.

7 Claims, 7 Drawing Sheets

HEATING DEVICE FOR END PLATE OF FUEL CELL STACK

CROSS-REFERENCE TO RELATED APPLICATION

This application claims under 35 U.S.C. §119(a) the benefit of Korean Patent Application No. 10-2010-0103805 filed Oct. 25, 2010, the entire contents of which are incorporated herein by reference.

BACKGROUND (a) Technical Field

The present invention relates to a heating device for an end plate of a fuel cell stack. More particularly, it relates to a heating device for an end plate of a fuel cell stack, which can prevent a decrease in temperature of unit cells around the ends of the fuel cell stack by providing a structure for circulating high temperature coolant discharged from the fuel cell stack in the end plate. A non-uniform temperature distribution in the fuel cell stack can thereby be prevented.

(b) Background Art

First, the configuration of a fuel cell stack (hereinafter referred to also as stack) will be briefly described with reference to FIGS. 6 and 8 below.

A membrane-electrode assembly (MEA) is positioned in the center of each unit cell of the fuel cell stack, and the MEA comprises a solid polymer electrolyte membrane 10, through which hydrogen ions (protons) are transported, and an electrode/catalyst layer such as a cathode ("air electrode") 12 and an anode ("fuel electrode) 14, in which an electrochemical reaction between hydrogen and oxygen takes place, disposed on both sides of the polymer electrolyte membrane 10.

Moreover, a gas diffusion layer (GDL) 16 and a gasket 18 are sequentially stacked on both sides of the MEA, where the cathode 12 and the anode 14 are located. A separator 20 including flow fields, through which reactant gases (such as hydrogen as a fuel and oxygen or air as an oxidant) are supplied and coolant passes, is located on the outsides of each GDL 16.

After several hundreds of unit cells are stacked, an end plate 30 for supporting and fixing the unit cells is connected to each end of the fuel cell stack.

Further, a current collector 32 for collecting electricity generated in the stack and supplying the electricity to the outside is mounted on the inside of each end plate 30.

An oxidation reaction of hydrogen occurs at the anode 14 of the stack to produce hydrogen ions (protons, $H^+$) and electrons ($e^-$) by a catalyst disposed in the electrode/catalyst layer. The hydrogen ions and electrons are transmitted to the cathode 12 through the electrolyte membrane 10 and the separator 20. At the cathode 12, water is produced by the electrochemical reaction between the hydrogen ions and electrons transmitted from the anode 14 and the oxygen-containing air. Electrical energy generated by the flow of electrons is supplied to a load that uses the electrical energy through the current collector 32 of the end plate 30.

Hydrogen inlet and outlet manifolds, air inlet and outlet manifolds, and coolant inlet and outlet manifolds are further formed adjacent to each other on the separators 20 as well as the end plates 30.

The flow of coolant for cooling the unit cells of the stack is as follows. As shown in FIG. 6, the coolant supplied through a coolant inlet manifold 34 cools the unit cells of the stack and is then discharged through a coolant outlet manifold 36.

However, when measuring the temperature of the coolant in the coolant outlet manifold 36, it can be seen from the graph of FIG. 7, which displays the temperature for the various cells in the stack, that the temperature of the coolant at the upstream is high and gradually decreases at the downstream. In other words, the temperature of the coolant increases as it cools the unit cells of the stack, and then gradually decreases as the coolant flows toward the outlet of the end plate through the coolant outlet manifold.

If the temperature of the coolant decreases as the coolant flows toward the outlet of the end plate through the coolant outlet manifold, the temperature of unit cells adjacent to the end plate also decreases, and thus a non-uniform temperature distribution occurs in the entire unit cells.

A typical polymer electrolyte membrane fuel cell generally exhibits excellent performance in a temperature range from room temperature to 80° C. However, if the non-uniform temperature distribution occurs in the entire unit cells as the temperature of several unit cells is lowered, the performance is reduced by a reduction in reaction activity and a reduction in ion conductivity of the electrolyte membrane.

In particular, if the temperature of the stack mounted in a vehicle is lowered below the freezing point (e.g. if the outside temperature is below zero such as in winter conditions), the activity of the electrodes including the cathode and the anode in the stack is reduced. Moreover, the water carrying hydrogen ions in the electrolyte membrane freezes in the stack, which reduces the ion conductivity of the electrolyte membrane, thereby deteriorating the performance of the stack.

Further, if the temperature of the stack is low while humidified gas is supplied to the stack, a flooding problem occurs due to condensation of water. This has a critical effect on the performance and durability of the stack. Therefore, in order to operate the fuel cell stack at an appropriate temperature, it is very important to uniformly maintain the temperature distribution of the fuel cell stack, in which several hundreds of unit cells are stacked together, in a predetermined range.

Taking these factors into account, many methods have been devices in an attempt to prevent a decrease in temperature of unit cells adjacent to the end plate. For example, methods have been proposed wherein a device is inserted for thermally insulating or heating the area between the end plate and the stacked cells.

For example, U.S. Pat. No. 6,824,901 describes a method of inserting a thick insulator between an end plate and a separator to thermally insulate the region where the reaction occurs, or disposing a plane heater between the end plate and the separator to maintain the temperature of the entire fuel cell stack at a predetermined level during cold start-up.

Korean Patent No. 10-2006-0077284 describes a fuel cell stack, in which different types of current collectors having different coefficients of thermal expansion are provided to generate heat, thereby thermally insulating unit cells around the end plate.

Korean Patent No. 10-2006-0074397 describes a stack fixture structure for cold start-up of a fuel cell vehicle, in which a cover for covering the outside of an end plate is attached to a fuel cell stack to form an air layer for thermal insulation.

However, in the case where the entire end plate is thermally insulated, the thickness of the insulator for the thermal insulation should be increased, which increases the thickness of the entire fuel cell stack. In the case where the cover is attached to the outside of the end plate, it is impossible to prevent the heat generated in the electrodes from being transferred to the end plate. Moreover, in the case where the heater is disposed between the end plate and the separator, it is necessary to supply an external power source for the operation of the heater, and thus a system for controlling the heater and power supply is complicated.

Accordingly, there remains a need in the art for an apparatus and method for maintaining a uniform temperature distribution in a fuel cell stack.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a heating device for an end plate of a fuel cell stack. The heating device can uniformly maintain the temperature distribution of unit cells constituting the fuel cell stack in a predetermined range in such a manner that high temperature coolant flowing from the upstream of a coolant outlet manifold to the downstream is allowed to circulate through the inside of the end plate and to be discharged to the outside. As such, the thermal energy of the coolant is supplied to the end plate and, at the same time, is transferred to unit cells adjacent to the end plate.

In one aspect, the present invention provides a heating device for an end plate of a fuel cell stack, the device comprising a coolant circulator provided within the end plate such that all or part of the high temperature coolant flowing through a coolant outlet manifold flows through the coolant circulator. As such, the thermal energy of the coolant is transferred to the end plate and unit cells adjacent to the end plate.

In a preferred embodiment, the coolant circulator comprises: a single coolant inlet and a single coolant outlet formed on one end of the end plate and being in contact with the coolant outlet manifold, wherein the single coolant outlet can be provided in front of the fuel cell stack and the single coolant inlet can be provided in the rear of the single coolant outlet; and a single coolant flow field connected between the single coolant inlet and the single coolant outlet and formed inside the end plate through which the coolant is circulated.

In another preferred embodiment, the single coolant flow field comprises: a single upstream channel extending from the single coolant inlet to the inside of the other end of the end plate, which is in contact with a coolant inlet manifold, through one side of the end plate; and a single downstream channel extending from the other end of the end plate to the single coolant outlet through the other side of the end plate.

In still another preferred embodiment, the coolant circulator comprises: multiple coolant inlets and multiple coolant outlets formed on one end of the end plate being in contact with the coolant outlet manifold, the multiple coolant inlets or multiple coolant outlets being provided in front of the fuel cell stack; and multiple coolant flow fields connected between the multiple coolant inlets and the multiple coolant outlets and formed inside the end plate through which the coolant is circulated.

In yet another preferred embodiment, the multiple coolant flow fields comprise: multiple upstream channels extending from the multiple coolant inlets to the inside of the other end of the end plate, which is in contact with a coolant inlet manifold, through one side of the end plate, the multiple upstream channels forming several separate spaces in the end plate in the left and right direction; and multiple downstream channels extending from the other end of the end plate to the multiple coolant outlets through the other side of the end plate, the multiple downstream channels forming several separate spaces in the end plate in the left and right direction.

In still yet another preferred embodiment, each of the multiple coolant inlets is integrally formed with a vane for guiding the flow of the coolant.

In a further preferred embodiment, the height of the vanes formed on the multiple coolant inlets increases as it goes from the upstream of the coolant outlet manifold to the downstream.

In another further preferred embodiment, the multiple upstream channels of the multiple coolant flow fields are provided in parallel to each other on one side of left and right sides, and the multiple downstream channels are provided in parallel to each other on the other side of the left and right sides.

In still another further preferred embodiment, each of the multiple upstream channels of the multiple coolant flow fields and each of multiple downstream channels of the multiple coolant flow fields are formed alternately on the left and right sides.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
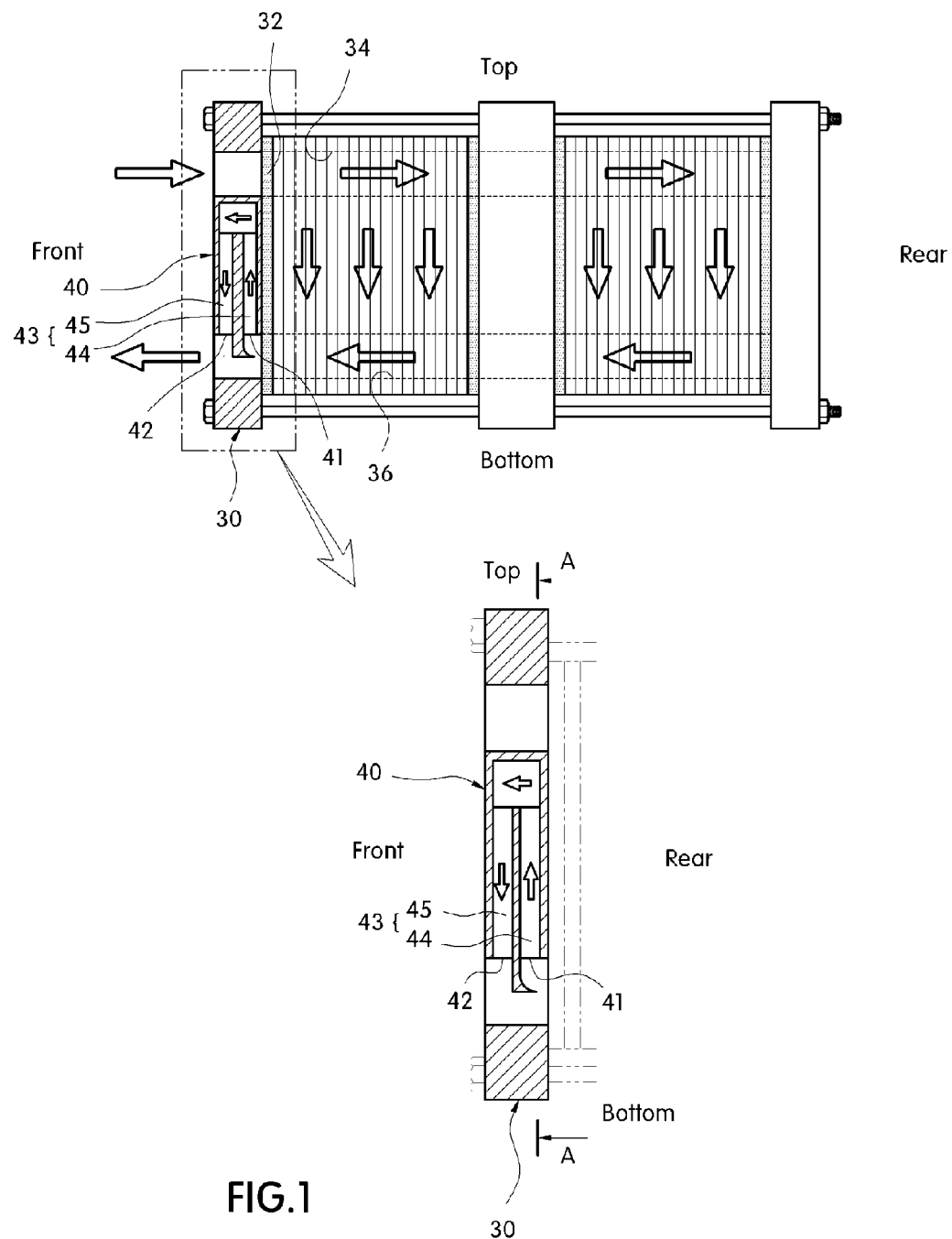
FIG. 1 is a cross-sectional view showing a heating device for an end plate of a fuel cell stack in accordance with a first embodiment of the present invention.

Reference numerals set forth in the Drawings includes reference to the following elements as further discussed below:

| | |
|---|---|
| 10: electrolyte membrane | 12: cathode |
| 14: anode | 16: gas diffusion layer |
| 18: gasket | 20: separator |
| 30: end plate | 32: current collector |
| 34: coolant inlet manifold | 36: coolant outlet manifold |
| 40: coolant circulator | 41: single coolant inlet |
| 42: single coolant outlet | 43: single coolant flow field |
| 44: single upstream channel | 45: single downstream channel |
| 50: coolant circulator | 51: multiple coolant inlet |
| 52: multiple coolant outlet | 53: multiple coolant flow field |
| 54: multiple upstream channel | 55: multiple downstream channel |
| 56: vane | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As mentioned above, when the temperature of coolant after cooling a fuel cell stack decreases as the coolant flows toward an outlet of an end plate through a coolant outlet manifold, the temperature of unit cells adjacent to the end plate also decreases. As a result, a non-uniform temperature distribution occurs in the entire unit cells.

The present invention provides a method and apparatus for maintaining the temperature distribution of unit cells constituting a fuel cell stack in a predetermined range. In particular, according to the present invention, the thermal energy of high temperature coolant discharged after cooling the unit cells of the stack is transferred to an end plate and unit cells adjacent to the end plate, to thereby reduce and even prevent a temperature decrease of the unit cells adjacent to the end plate at the end of the fuel cell stack during operation.

For example, as shown in the figures, a separate coolant circulator 40 is provided inside the end plate 30 such that all or part of the high temperature coolant that cools the unit cells of the stack and flows through a coolant outlet manifold 36 is introduced into the coolant circulator 40.

Therefore, the thermal energy of the coolant flowing through the coolant circulator 40 is easily transferred to the end plate 30 and the unit cells adjacent to the end plate 30, and a decrease in temperature of the unit cells adjacent to the end plate 30 at the end of the fuel cell stack can be reduced and even prevented.

Next, the configuration and operation of a coolant circulator in accordance with a first embodiment of the present invention will be described with reference to FIG. 1.

In the coolant circulator 40 shown in FIG. 1, a single coolant inlet 41 and a single coolant outlet 42 are formed on one end ("bottom" end, as shown in the figures) of the end plate 30 and are disposed so as to be in contact with the coolant outlet manifold 36. In particular, the single coolant outlet 42 can be provided in front of the stack (i.e., at the final discharge port of the coolant), while the single coolant inlet 41 can be provided in the rear of the single coolant outlet 42, as shown.

As further shown, a single coolant flow field 43 connected between the single coolant inlet 41 and the single coolant outlet 42 is provided inside the end plate 30.

In particular, the single coolant flow field 43 can comprise a single upstream channel 44 and a single downstream channel 45. As shown, for example, the single upstream channel 44 can extend from the single coolant inlet 41 to the inside of the other end ("top" end as shown in the figures) of the end plate 30, which is in contact with a coolant inlet manifold 34, through one side of the end plate 30. The single downstream channel 45 can then extend from the other end ("top" end) of the end plate 30 to the single coolant outlet 42 through the other side of the end plate 30.

Therefore, the low temperature coolant supplied through the coolant inlet manifold 34 cools the unit cells of the stack to absorb heat, and then flows through the coolant outlet manifold 36.

Subsequently, all or part of the high temperature coolant flowing from the upstream of the coolant outlet manifold 36 to the downstream is supplied to the single coolant flow field 43 through the single coolant inlet 41.

The coolant supplied through the single coolant inlet 41 then flows along the single upstream channel 44 and through the one side of the end plate 30, and then flows along the single downstream channel 45 to the single coolant outlet 42 through the other side of the end plate 30.

Here, the thermal energy from the high temperature coolant flowing through the single upstream channel 44 and the single downstream channel 45 is transferred to the end plate 30 and the unit cells adjacent to the end plate 30 to maintain the temperature of the unit cells adjacent to the end plate 30. As a result, it is possible to reduce and even to prevent the decrease in temperature of the unit cells, and thus it is possible to uniformly maintain the temperature distribution of the unit cells constituting the stack within a predetermined range.

Next, the configuration and operation of a coolant circulator in accordance with a second embodiment of the present invention will be described with reference to FIG. 2.

Figure 2:
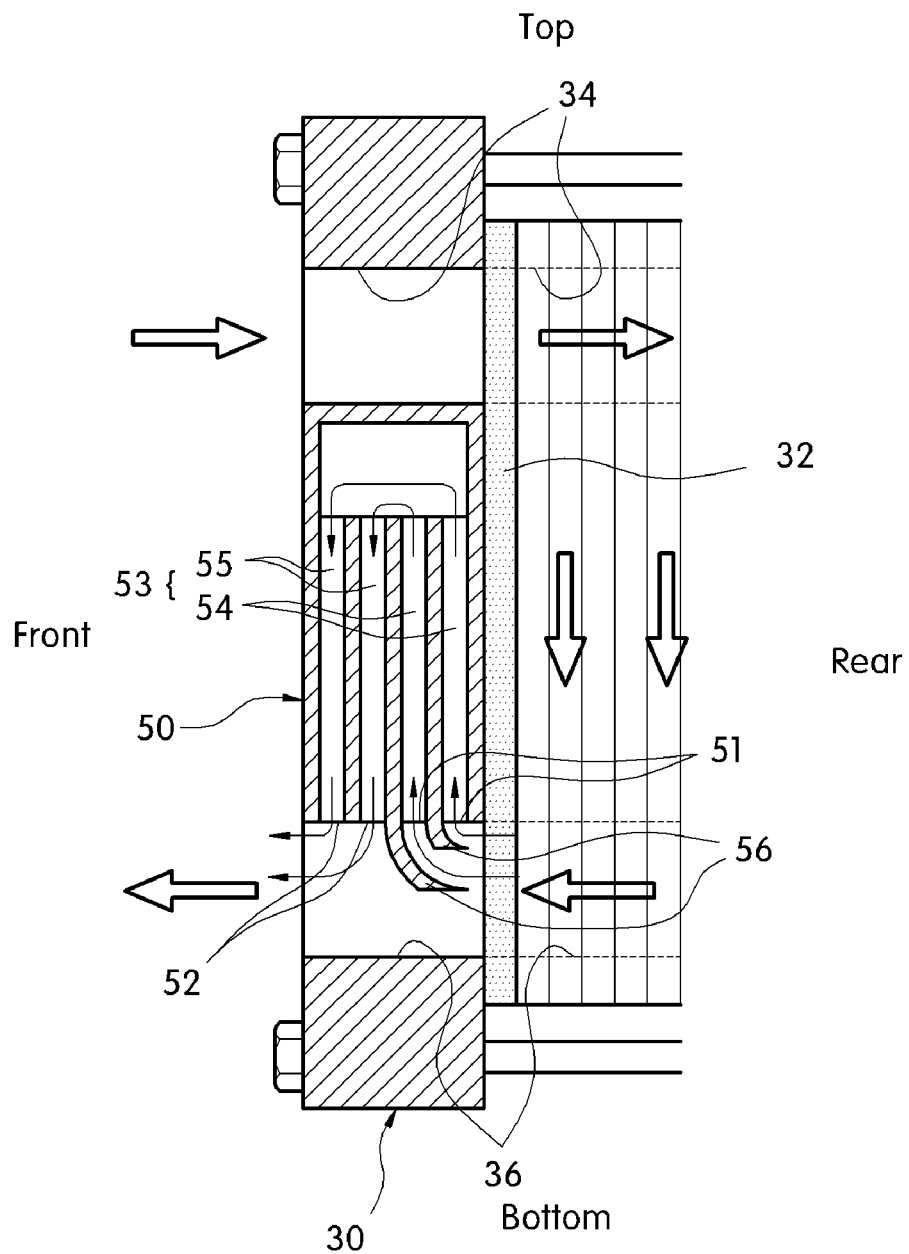
FIG. 2 is a cross-sectional view showing a heating device for an end plate of a fuel cell stack in accordance with a second embodiment of the present invention.

In the coolant circulator 50 as shown in FIG. 2, multiple coolant inlets 51 and multiple coolant outlets 52 are formed on one end ("bottom" end) of an end plate 30 being in contact with a coolant outlet manifold 36. For example, two coolant outlets 52 can be provided in parallel to each other in front of the stack (i.e., at the final discharge port of the coolant) and two coolant inlets 51 can be provided in parallel to each other in the rear of the multiple coolant outlets 52. Of course, the coolant inlets and outlets 51, 52 are not limited to only two, and any multiple number of coolant inlets and outlets 51, 52 can be provided.

As further shown, multiple coolant flow fields 53 can be disposed within the end plate 30 between the multiple coolant inlets 51 and the multiple coolant outlets 52.

In particular, the multiple coolant flow fields 53 can comprise multiple upstream channels 54 extending from the multiple coolant inlets 51 to the inside of the other end ("top" end) of the end plate 30, which is in contact with a coolant inlet manifold 34, through one side of the end plate 30, and multiple downstream channels 55 extending from the other end ("top" end) of the end plate 30 to the multiple coolant outlets 52 through the other side of the end plate 30.

For example, the multiple upstream channels 54 can form several separate spaces in the end plate 30 in the left and right direction, and the multiple downstream channels 55 can also form several separate spaces in the end plate 30 in the left and right direction. In a preferred embodiment, the multiple upstream channels 54 of the multiple coolant flow fields 53 are disposed parallel to each other on the right side of the multiple downstream channels 55, and the multiple downstream channels 55 of the multiple coolant flow fields 53 are disposed parallel to each other on the left side of the multiple upstream channels 54. Of course, the invention is not limited to this specific arrangement and, for example, the multiple upstream channels 54 and the multiple downstream channels 55 of the multiple coolant flow fields 53 may be formed in one space, respectively, on the left and right sides.

As shown in connection with FIG. 2, a vane 56 can be further provided for guiding the flow of the coolant. For example, the vane 56 can be integrally formed one or more of the multiple coolant inlets 51. In accordance with a preferred embodiment, for example, as shown in FIG. 2, the height of the vanes 56 formed on the multiple coolant inlets 51 increases from the upstream of the coolant outlet manifold 36 to the downstream.

For example, based on the flow direction of the coolant, a vane 56 having a smaller height can be mounted on the coolant inlet 51 at the upstream of the coolant outlet manifold 36, while a vane 56 having a greater height can be mounted on the coolant inlet 51 at the downstream of the coolant outlet manifold 36. As such, the flow of the coolant can be easily guided toward the multiple coolant flow fields 53.

Therefore, the low temperature coolant supplied through the coolant inlet manifold 34 cools the unit cells of the stack to absorb heat, and then flows through the coolant outlet manifold 36.

Subsequently, all or part of the high temperature coolant flowing from the upstream of the coolant outlet manifold 36 to the downstream is supplied to the multiple coolant flow fields 53 through the multiple coolant inlets 51, preferably with the guidance of the vanes 56.

For example, the coolant supplied through the multiple coolant inlets 51 flows along the multiple upstream channels 54 extending to the inside of the other end ("top" end) of the end plate 30, which is in contact with the coolant inlet manifold 34, through the one side of the end plate 30, and then flows along the multiple downstream channels 55 extending from the other end ("top" end) of the end plate 30 to the multiple coolant outlets 52 through the other side of the end plate 30.

Therefore, the thermal energy from the high temperature coolant flowing through the multiple upstream channels 54 and the multiple downstream channels 55 is transferred to the end plate 30 and the unit cells adjacent to the end plate 30 to maintain the temperature of the unit cells adjacent to the end plate 30. As a result, it is possible to reduce and even to prevent the decrease in temperature of the unit cells, and thus to uniformly maintain the temperature distribution of the entire unit cells constituting the stack within a predetermined range.

Next, the configuration and operation of a coolant circulator in accordance with a third embodiment of the present invention will be described with reference to FIG. 3.

Figure 3:
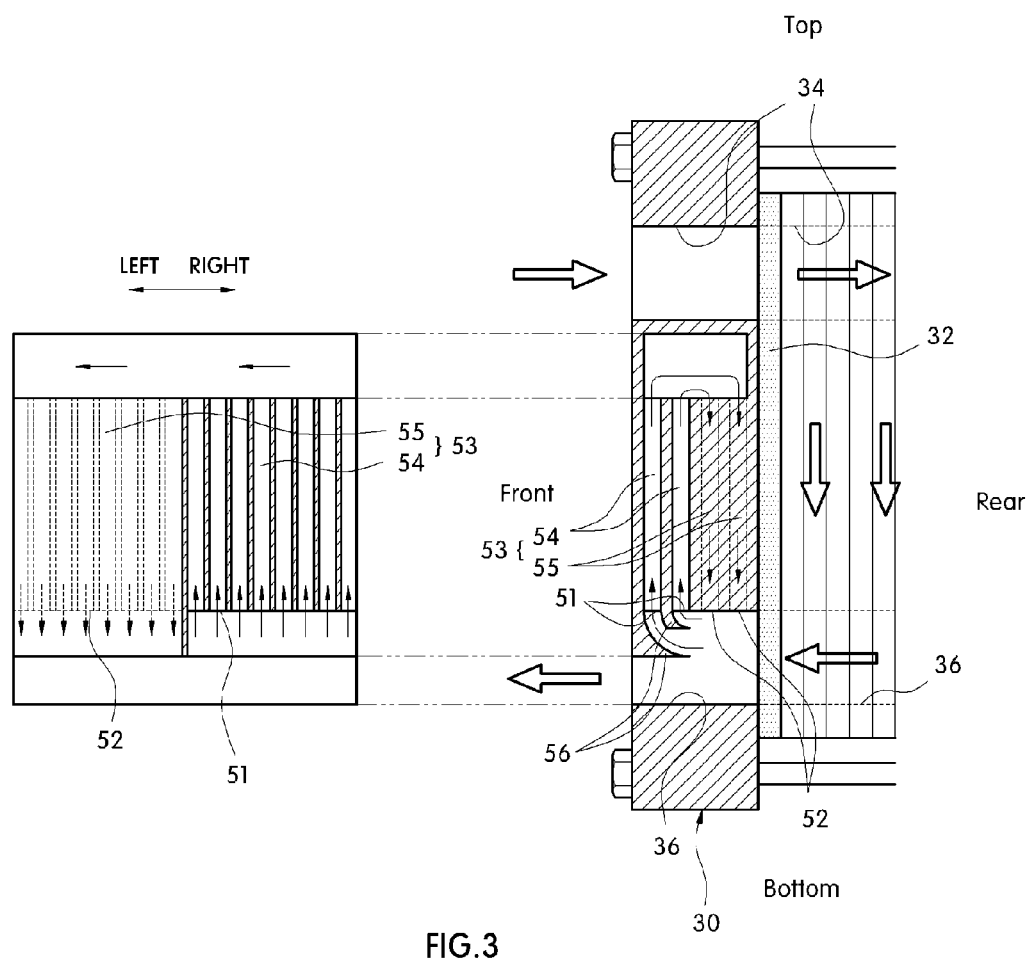
FIG. 3 is a cross-sectional view showing a heating device for an end plate of a fuel cell stack in accordance with a third embodiment of the present invention.

In the coolant circulator shown in FIG. 3, multiple coolant inlets 51 and multiple coolant outlets 52 are formed on one end ("bottom" end) of an end plate 30 being in contact with a coolant outlet manifold 36. For example, two multiple coolant inlets 51 can be provided, preferably parallel to each other, in front of the stack (i.e., at the final discharge port of the coolant). Two multiple coolant outlets 52 can further be provided, preferably parallel to each other, in the rear of the multiple coolant inlets 51. As noted in connection with FIG. 2, any multiple number of coolant inlets and outlets 51, 52 other than two can also be provided.

In the third embodiment, the positions of the multiple coolant inlets 51 and the multiple coolant outlets 52 are opposite to those in the second embodiment. Therefore, the positions of corresponding structures, particularly the multiple upstream channels 54 and multiple downstream channels 55 of multiple coolant flow fields 53, are also opposite to those in the second embodiment.

Therefore, when the coolant is discharged through the multiple downstream channels 55 and the multiple coolant outlets 52, the coolant may be reintroduced into the multiple downstream channels 55 in the second embodiment. However, in the third embodiment, the multiple downstream channels 55 and the multiple coolant outlets 52 are located on the downstream side compared to the multiple upstream channels 54 and the multiple coolant inlets 51, and thus it is possible to prevent the coolant from flowing in reverse toward the multiple downstream channels 55.

Likewise, in the third embodiment, the thermal energy from the high temperature coolant flowing through the multiple upstream channels 54 and the multiple downstream channels 55 is transferred to the end plate 30 and the unit cells adjacent to the end plate 30, to thereby maintain the temperature of the unit cells adjacent to the end plate 30. As a result, it is possible to reduce and to even prevent the decrease in temperature of the unit cells, and thus it is possible to uniformly maintain the temperature distribution of the entire unit cells constituting the stack within a predetermined range.

Next, the configuration and operation of coolant circulators in accordance with fourth and fifth embodiments of the present invention will be described with reference to FIGS. 4 and 5.

In the coolant circulator in accordance with the fourth embodiment of the present invention (FIG. 4), multiple coolant inlets 51 and multiple coolant outlets 52 are formed on one end ("bottom" end) of an end plate 30 being in contact with a coolant outlet manifold 36. For example, a plurality of multiple coolant inlets 51 are provided, preferably parallel to each other, on one side of left and right sides (e.g. on the right side as shown in FIG. 4), and a plurality of multiple coolant outlets 52 are provided, preferably parallel to each other, on the other side of the left and right sides (e.g. on the left side as shown in FIG. 4).

According to some embodiments, one or more vanes 56, preferably having an increasing height from the upstream to the downstream, are mounted on one or more of the multiple coolant inlets 51.

Figure 4:
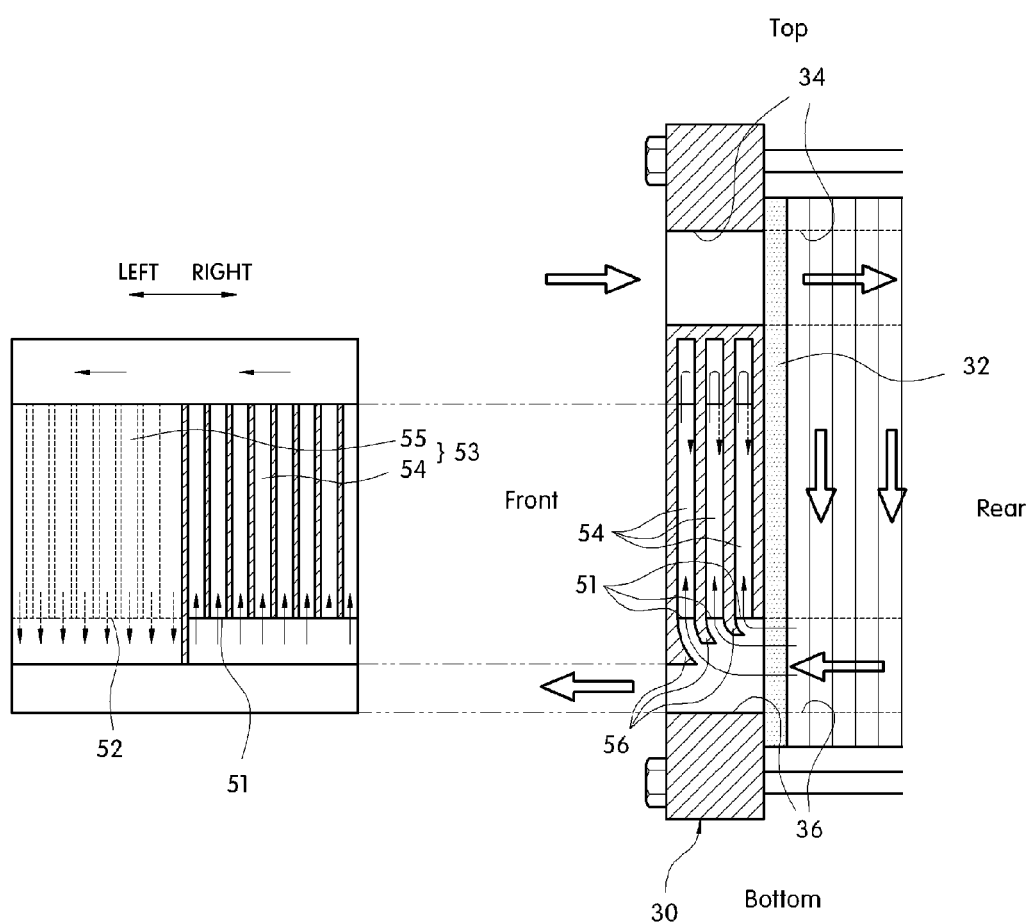
FIG. 4 is a cross-sectional view showing a heating device for an end plate of a fuel cell stack in accordance with a fourth embodiment of the present invention.
Figure 5:
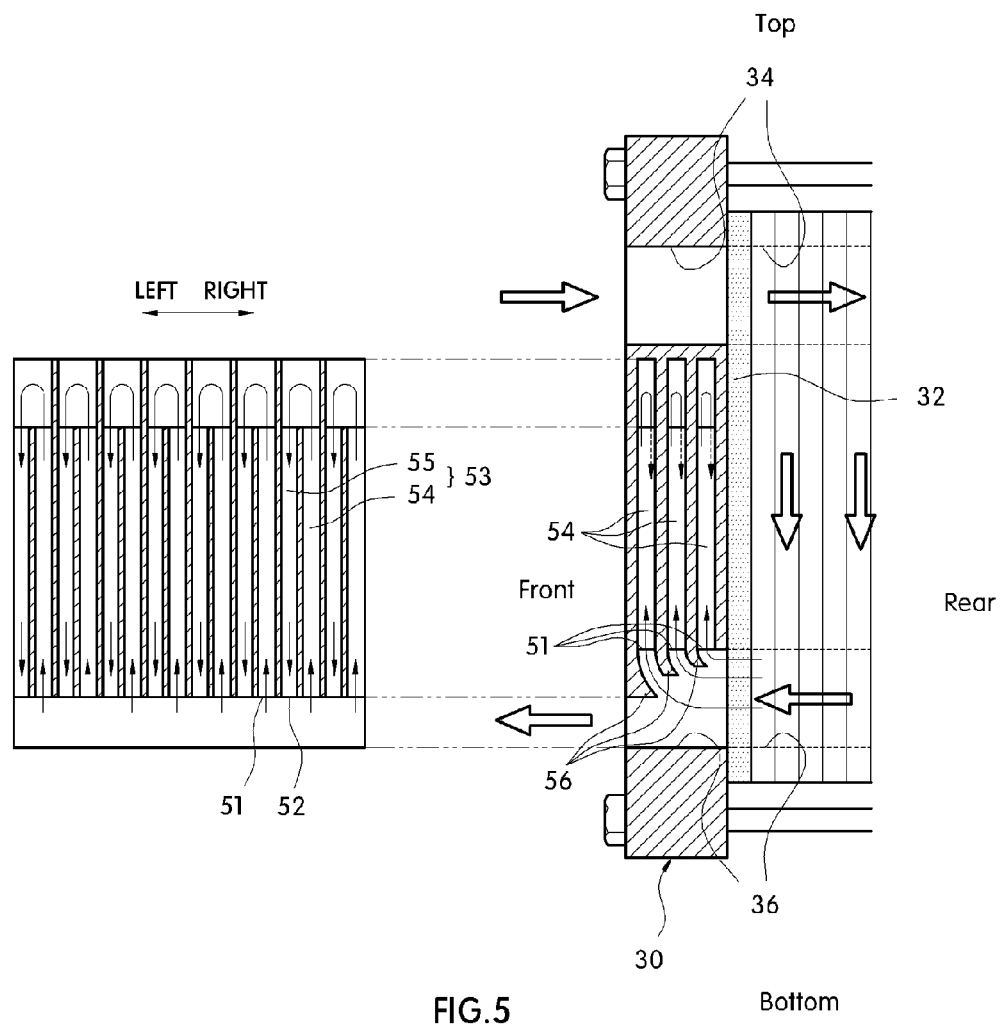
FIG. 5 is a cross-sectional view showing a heating device for an end plate of a fuel cell stack in accordance with a fifth embodiment of the present invention.
Figure 6:
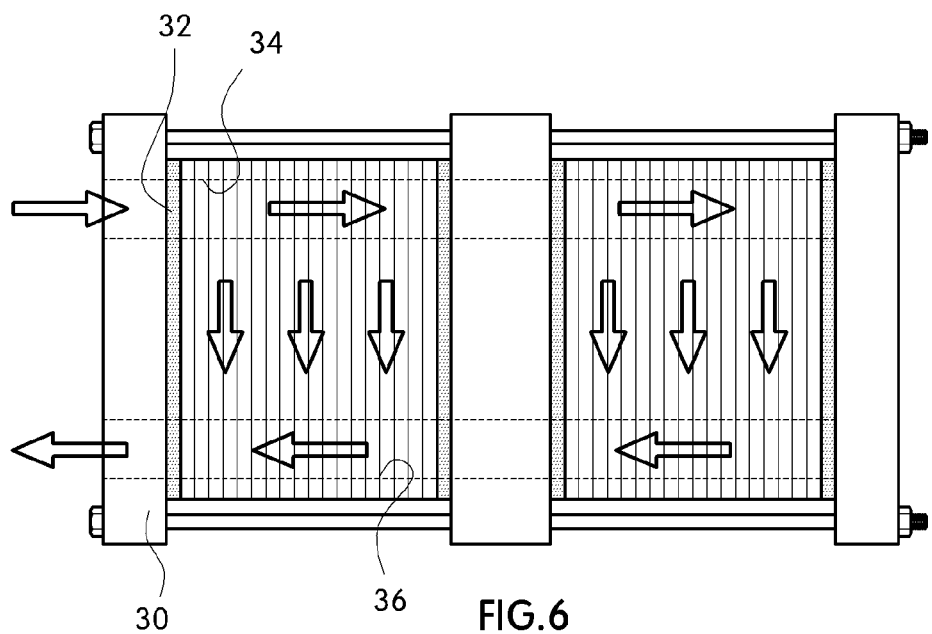
FIG. 6 is a cross-sectional view showing the flow of coolant of a fuel cell stack.
Figure 7:
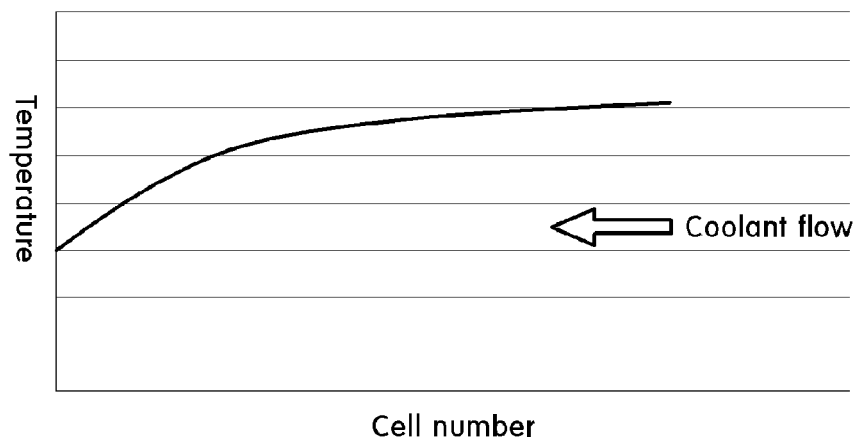
FIG. 7 is a graph showing a change in temperature of coolant flowing through a coolant outlet manifold of a fuel cell stack.
Figure 8:
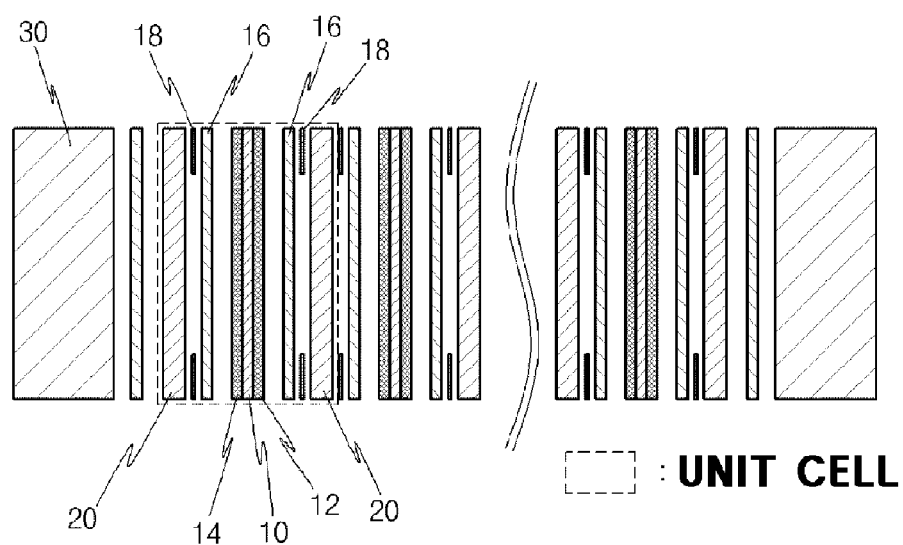
FIG. 8 is a schematic diagram showing the configuration of a typical fuel cell stack.

Further, a plurality of multiple upstream channels 54 of multiple coolant flow fields 53, formed inside the end plate 30, are provided, preferably parallel to each other, on one side of left and right sides (e.g. on the right side as shown in FIG. 4), and a plurality of multiple downstream channels 55 are provided, preferably parallel to each other, on the other side of the left and right sides (e.g. on the left side as shown in FIG. 4). Thus, the multiple upstream channels 54 extend from the multiple coolant inlets 51, and the multiple downstream channels 55 meet the multiple coolant outlets 52.

In the coolant circulator in accordance with the fifth embodiment of the present invention (FIG. 5), multiple coolant inlets 51 and multiple coolant outlets 52 are formed on one end ("bottom" end) of an end plate 30 being in contact with a coolant outlet manifold 36. In particular, a plurality of multiple coolant inlets 51 and a plurality of multiple coolant outlets 52 are provided, preferably parallel to each other, and each of the multiple coolant inlets 51 and each of the multiple coolant outlets 52 are formed in an alternating arrangement, as shown.

Moreover, within the end plate a plurality of multiple upstream channels 54 and a plurality of multiple downstream channels 55 of multiple coolant flow fields 53 are provided, preferably parallel to each other, with each of the multiple upstream channels 54 and each of the multiple downstream channels 55 being provided in an alternating arrangement, as shown. The multiple upstream channels 54 extend from the multiple coolant inlets 51, and the multiple downstream channels 55 meet the multiple coolant outlets 52, respectively.

Therefore, the low temperature coolant supplied through the coolant inlet manifold 34 cools the unit cells of the stack to absorb heat and then flows through the coolant outlet manifold 36.

Subsequently, all or part of the high temperature coolant flowing from the upstream of the coolant outlet manifold 36 to the downstream is supplied to the multiple coolant flow fields 53 through the multiple coolant inlets 51, preferably with the guidance of the vanes 56.

In particular, the coolant supplied through the multiple coolant inlets 51 flows along the multiple upstream channels 54 extending to the inside of the other end ("top" end) of the end plate 30, which is in contact with the coolant inlet manifold 34, through one side of the end plate 30, and then flows along the multiple downstream channels 55 extending from the other end ("top" end) of the end plate 30 to the multiple coolant outlets 52 through the other side of the end plate 30.

When the coolant is discharged through the coolant outlet manifold 36, high inertia energy can be applied to the coolant by the guide vanes 56, and thus the coolant is easily introduced into the multiple coolant inlets 51, passes through the multiple upstream channels 54, and flows through the multiple downstream channels 55, whose pressure is relatively low, to the multiple coolant outlets 52.

Likewise, the thermal energy from the high temperature coolant flowing through the multiple upstream channels 54 and the multiple downstream channels 55 is transferred to the end plate 30 and the unit cells adjacent to the end plate 30, to thereby maintain the temperature of the unit cells adjacent to the end plate 30. As a result, it is possible to reduce ad even to prevent the decrease in temperature of the unit cells, and thus it is possible to uniformly maintain the temperature distribution of the entire unit cells constituting the stack in a predetermined range.

As described above, the present invention provides the following effects.

According to the present invention, the coolant circulation flow field is provided in the end plate such that all or part of the high temperature coolant that cools the stack and is discharged from the upstream side of the coolant outlet manifold to the downstream side passes through the coolant circulation flow field, to transfer the thermal energy of the coolant to the end plate and the unit cells adjacent to the end plate. As such, the temperature distribution of the unit cells constituting the stack can be maintained within a predetermined range.

In particular, the thermal energy from the high temperature coolant flowing through the coolant circulation flow field in the end plate is transferred to the end plate and the unit cells adjacent to the end plate, to thereby reduce and even prevent the decrease in temperature of the unit cells. It is thus possible to uniformly maintain the temperature distribution of the entire unit cells constituting the stack within a predetermined range, thereby reducing and even preventing deterioration of performance of the stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A heating device for an end plate of a fuel cell stack, the device comprising:
    a coolant circulator disposed within the end plate; and
    a coolant outlet manifold through which a high temperature coolant flows through the coolant circulator to transfer thermal energy of the coolant to the end plate and unit cells adjacent to the end plate,
    wherein the coolant circulator includes:
        multiple coolant inlets and multiple coolant outlets formed on a bottom end of the end plate, the bottom end of the end plate being in contact with the coolant outlet manifold, the multiple coolant inlets or multiple coolant outlets being provided in the front of the fuel cell stack; and
    wherein one or more multiple coolant inlets is integrally formed with a vane for guiding the flow of the coolant, and
    wherein the vane at the coolant inlet is configured to extend into the coolant outlet manifold and an extending end of the vane is spaced away from the bottom of the coolant outlet manifold to allow only a portion of coolant flowing through a coolant outlet manifold into the coolant circulator.

2. The device of claim 1, wherein the single coolant flow field comprises:
    multiple upstream channels extending from the multiple coolant inlets to the inside of a top end of the end plate, the top end of the end plate being in contact with a coolant inlet manifold, the multiple upstream channels extending through a first side of the end plate; and
    multiple downstream channels extending from the top end of the end plate to the multiple coolant outlets, the multiple downstream channels extending through a second side of the end plate.

3. The device of claim 1, wherein the multiple coolant flow fields comprise:

multiple upstream channels extending from the multiple coolant inlets to the inside of a top end of the end plate, the top end being in contact with a coolant inlet manifold, the multiple upstream channels extending through a first side of the end plate, the multiple upstream channels forming several separate spaces in the end plate extending in a left and right direction relative to the top end; and multiple downstream channels extending from the top end of the end plate to the multiple coolant outlets, the multiple downstream channels extending through the second side of the end plate, the multiple downstream channels forming several separate spaces in the end plate extending in the left and right direction relative to the top end.

4. The device of claim 1, wherein the height of the one or more vanes increases respectively from the upstream of the coolant outlet manifold to the downstream.

5. The device of claim 3, wherein the multiple upstream channels of the multiple coolant flow fields are disposed parallel to each other on the first side, the first side comprising a left or right side of the end plate, and the multiple downstream channels are disposed parallel to each other on the second side opposite the first side.

6. The device of claim 3, wherein each of the multiple upstream channels of the multiple coolant flow fields and each of multiple downstream channels of the multiple coolant flow fields are disposed in an alternating arrangement along the end plate.

7. A fuel cell stack comprising:

multiple stacked unit cells;

an end plate connected to each end of the fuel cell stack; and the heating device according to claim 1 in connection with the end plate.

* * * * *